: 2,962,422
Patented Nov. 29, 1960

2,962,422

TRANSFORMATION OF STEROIDS WITH SANSEVIERIA ZEYLANICA

Louis G. Nickell, Chester, Conn., assignor to Chas. Pfizer & Co., Inc., Brooklyn, N.Y., a corporation of Delaware No Drawing. Filed May 10, 1960, Ser. No. 28,010

4 Claims. (Cl. 195—51)

This application is concerned with a method for transformation of the A-ring of certain steroid compounds by the action of plant cells. More particularly it is concerned with the preparation of A-ring-saturated and $\Delta^{1,4}$ steroids from the corresponding $\Delta^4$ steroids by the action of cellular extracts of the leaves of the yellow-edged-leaf variety of Sansevieria zeylanica. A particularly useful reaction which may be accomplished with the new process is the conversion of compound S (Reichstein's Substance S or 17-hydroxy-11-desoxycorticosterone) to the corresponding $\Delta^{1,4}$ compound, a useful intermediate in the preparation of prednisolone.

It has been found that when compound S is brought into contact with such cellular extracts in an aqueous system, two conversions take place: saturation of the A-ring and dehydrogenation to $\Delta^{1,4}$-pregnadiene-17$\alpha$,21-diol-3,20-dione. The relative proportions of the two products can be varied by varying the reaction time. Thus, in the earlier stages of the reaction the A-ring-saturated derivative predominates, but if the process is permitted to continue, the $\Delta^{1,4}$-derivative increases in concentration to become the principal product.

A great number of leaves, seeds, germinating seedlings and roots have been tested for their ability to produce these results, with negative findings. Positive results have been obtained only with cellular extracts of Sansevieria zeylanica, the florist's and horiculturist's houseplant otherwise known as snake plant, bowstring hemp, or mother-in-law's tongue. Particularly surprising, it is only the yellow-edged-leaf variety which exhibits this highly selective action, and only the leaves of this plant. Cellular extracts of the roots, for example, do not produce the effect.

A convenient procedure for preparing the necessary cellular extract comprises grinding the Sansevieria zeylanica leaves with water. This may be carried out, for example, in a Waring Blendor. Suitable proportions will vary over a wide range but for convenience from about 100 to 1000 grams of leaves (fresh weight) per liter of water may be employed. Even less than 100 grams per liter may sometimes be more favorably used but materially more than 1000 grams per liter will usually be found too heavy a slurry for convenient handling.

The steroid will generally be introduced into the resulting aqueous homogenate in a concentration of up to about one to two grams per 100 ml., although even higher concentrations may sometimes be favorable. While the solubility of the steroids in water is rather limited, an excess of the material will slowly be converted to the desired products. If a water-miscible solvent solution of the steroid compound is added to the aqueous homogenate, the steroid is generally precipitated in a finely divided state in the presence of a large excess of water, thereby facilitating intimate contact with the plant cells.

In order to create and maintain a uniform dispersion it is desirable to provide agitation, by shaking or stirring, for example, during the reaction period. Temperatures of from about 20 to 40° C. are suitable, and room-temperature reaction may be conveniently employed. The time required will vary somewhat, depending on the product desired and the concentrations and temperature selected, but ordinarily from about 2 to 14 days will be sufficient. As previously noted, the shorter reaction periods favor the A-ring saturation, while the longer periods lead to the $\Delta^{1,4}$ steroid as the main product. Steroid conversions of up to 50% and higher are achieved by the new process.

The reaction products may be isolated by extraction from the aqueous mixture with a suitable water-immiscible organic solvent. Chlorinated lower hydrocarbons, such as chloroform, methylene chloride, trichlorethane, and ethylene dichloride are particularly useful. The extract of product and unreacted starting material may be concentrated to a small volume or to dryness to obtain a solid product. Purification of the product may be accomplished in several ways, as by recrystallization procedures from organic solvents or by chromatography on alumina columns or other suitable solid adsorbents. The steroid mixture in concentrated chloroform or methylene chloride solution may be applied to a column prepared from a mixture of silica gel and a lower alcohol such as ethanol. The column may then be washed with additional amounts of solvent to remove impurities and the adsorbed mixture separated by the gradual addition of a mixture of the solvent together with a small concentration, for example 1 to 5%, of a lower alcohol. The products are eluted from the column by gradually increasing the alcohol content of the solvent.

Fractions of the eluted material from chromatographic columns may be checked for the nature of the product by subjecting small portions of the solutions to paper chromatography, and the same procedure may be applied to the concentrated extracts of the reaction mixture before separation. Such methods are described in U.S. Patent 2,905,592, issued September 22, 1959, and assigned to the same assignee as the present invention. Descending paper chromatograms utilizing paper treated with a 35% solution of propylene glycol (stationary phase) and developed with a mixture of 78 volumes of toluene and 22 volumes of dioxane (mobile phase) may be employed. Other suitable solvent systems include:

| Stationary Phase | Mobile Phase |
| --- | --- |
| diethylene glycol monoethyl ether | methylcyclohexane. |
| propylene glycol | toluene. |

Standard, known samples of the steroids may be run side by side with the materials under test.

Various methods may be used to detect the steroids on the paper chromatograms. For example, the sheets may be examined under ultraviolet light in a fluorescent scanner as described by Haines and Drake, Fed. Proc. Soc. Biol. Chem., volume 9, p. 180 (1950). The steroids having an $\alpha,\beta$-unsaturated ketone structure, such as compound S, testosterone, and their $\Delta^1$ derivatives, are revealed by their fluorescence. These spots may be outlined on the sheets in pencil to record their position.

Another method for locating certain of the steroid products on the chromatogram is by means of the reagent described by Burton et al., J. Biol. Chem., volume 188, p. 763 (1951). According to this procedure the paper is sprayed with an alcoholic potassium hydroxide solution of triphenyltetrazolium chloride. Steroids having a 21-hydroxy-20-keto side chain, including compound S and its $\Delta^1$- and dihydro derivatives, appear as red spots on drying the paper. The zones are outlined in pencil before they fade.

For detection of steroid products having a 3-keto group, the dried charomatogram may be dipped in a 2% solution of dinitrobenzene in ethanol, dried, and dipped in 14 N ethanolic potassium hydroxide. Upon air-drying, a blue spot reveals the position of the compound. This procedure may be applied, for example, in detecting androstane-17β-ol-3-one.

After separation of the reaction products by column chromatography, and characterization of the fractions as described, the desired fractions may be combined and concentrated to a small volume. The products may then be crystallized from suitable solvents such as ethyl acetate and compared with authentic samples.

In addition to its application to compound S transformations, the new process is also operative with other steroids of the pregnane as well as the androstane series. By way of example, the process may be applied to testosterone to produce $\Delta^{1,4}$-androstadiene-17β-ol-3-one.

The products of these reactions have a variety of uses. Thus, for example, $\Delta^{1,4}$-pregnadiene-17α,21-diol-3,20-dione ($\Delta^1$-compound S) may be subjected to 11-β-oxygenation by oxygenating strains of fungi of the genus Curvularia, as described in U.S. Patent 2,658,023, issued November 3, 1953, and assigned to the same assignee as the present invention. This process yields the valuable steroid, prednisolone.

Similarly, the A-ring-saturated derivative of compound S, pregnane-17α,21-diol-3,20-dione is a valuable intermediate for the preparation of other compounds, including some of the central nervous system depressants described in U.S. Patent 2,708,651, issued May 17, 1955, and assigned to the same assignee as the present invention. It may, for example, be converted to 21-hydroxypregnane-3,20-dione acetate by standard methods, namely, by treatment, in the form of the 21-acetate, with phosphorus oxychloride in pyridine to cause dehydration, followed by hydrogenation of the resulting unsaturated derivative over palladium-charcoal catalyst. The 21-hydroxypregnane-3,20-dione acetate produced may then be converted to valuable 3α,21-dihydroxypregnane-20-one-21 acetate salts as described in Example 5 of the above-mentioned U.S. Patent 2,708,651. Pregnane-17α,21-diol-3,20-dione may also be dehydrogenated to the corresponding $\Delta^{1,4}$ compound, for example, by treatment with bromine to introduce bromine in the 2 and 4 positions, followed by dehydrobromination.

Likewise, $\Delta^{1,4}$-androstadiene-17β-ol-3-one ($\Delta^1$-testosterone) undergoes a well known pyrolysis leading to aromatization with elimination of methane, to yield the estrogen, estradiol, while the A-ring-saturated derivative of testosterone, androstane-17β-ol-3-one is known anabolic agent useful in correcting nitrogen imbalance after serious injury or surgery.

The following examples are provided for purposes of illustration and should not be interpreted as limiting the invention, many variations of which are possible without departing from the spirit or scope thereof.

*Example I*

100 grams fresh leaves of the yellow-edged-leaf variety of *Sansevieria zeylanica* are ground in a Waring Blendor with 200 ml. water. A solution of 50 mgm. compound S in a small portion of acetone is then added to the aqueous homogenate and the suspension placed on a rotary shaker for 5 days at room temperature.

At the end of this period the suspension is extracted with an equal volume of chloroform and the extract is concentrated to about 2 ml. A sample of the concentrate is subjected to paper chromatography, utilizing benzene as the developing solvent and propylene glycol as the stationary phase. After developing for 8 hours, the chromatogram is examined with a fluorescent scanner under ultraviolet light and also by spraying with an alcoholic potassium hydroxide solution of triphenyltetrazolium chloride. The $\Delta^1$-compound S spot is revealed by both tests but dihydro-compound S is detected only by spraying. It is found that the A-ring-saturated derivative is the predominant product.

The products are isolated from chloroform concentrate by chromatography on a silica gel-ethanol column, utilizing a 98 to 2% by volume mixture of methylene chloride and 95% ethanol for development. Products recovered from the effluent fractions are identified by comparison with authentic samples.

*Example II*

The procedure of Example I is repeated, utilizing a 7-day reaction period, and this time $\Delta^1$-compound S is the predominant product.

*Example III*

The procedure of the preceding examples is repeated, substituting testosterone for compound S, with similar results. Paper chromatography is carried out with toluene as the developing solvent and propylene glycol as the stationary phase. Detection of products is accomplished by examination of the chromatograms under ultraviolet light and by the alkaline dinitrobenzene procedure previously described.

What is claimed is:

1. A process for converting a steroid selected from the group consisting of compound S and testosterone to a substance selected from the group consisting of the corresponding A-ring-saturated derivative and the corresponding $\Delta^1$-derivative which comprises contacting said steroid with a cellular extract of the leaves of the yellow-edged-leaf variety of *Sansevieria zeylanica* in an aqueous vehicle.

2. A process as in claim 1 wherein compound S is converted to $\Delta^{1,4}$-pregnadiene-17α,21-diol-3,20-dione.

3. A process as in claim 1 wherein compound S is converted to pregnane-17α,21-diol-3,20-dione.

4. A process as in claim 1 wherein testosterone is converted to $\Delta^{1,4}$-androstadiene-17β-ol-3-one.

No references cited.